United States Patent
Teicher

(10) Patent No.: US 7,065,645 B2
(45) Date of Patent: Jun. 20, 2006

(54) SYSTEM, METHOD, AND APPARATUS FOR VISUAL AUTHENTICATION

(76) Inventor: Mordechai Teicher, P.O. Box 991, Kfar-Saba (IL) 44109

( * ) Notice: Subject to any disclaimer, the term of this patent is extended or adjusted under 35 U.S.C. 154(b) by 115 days.

(21) Appl. No.: 10/371,690

(22) Filed: Feb. 16, 2003

(65) Prior Publication Data

US 2004/0143737 A1 Jul. 22, 2004

Related U.S. Application Data

(60) Provisional application No. 60/442,083, filed on Jan. 20, 2003.

(51) Int. Cl.
*H04L 9/00* (2006.01)
(52) U.S. Cl. .............. 713/167; 713/168; 713/179; 726/27; 726/28; 726/29; 235/462.01; 235/462.13; 235/462.28; 235/462.33; 380/262
(58) Field of Classification Search .............. 713/400, 713/168, 179, 200, 167; 235/462.12, 462.13, 235/462, 462.01, 462.28; 380/262; 726/27–29
See application file for complete search history.

(56) References Cited

U.S. PATENT DOCUMENTS

| | | | | |
|---|---|---|---|---|
| 4,720,860 A | * | 1/1988 | Weiss | 713/184 |
| 5,146,499 A | * | 9/1992 | Geffrotin | 713/172 |
| 5,233,658 A | * | 8/1993 | Bianco et al. | 713/185 |
| 5,450,491 A | * | 9/1995 | McNair | 713/184 |
| 5,661,284 A | * | 8/1997 | Freeman et al. | 235/380 |
| 5,668,875 A | | 9/1997 | Brown et al. | |
| 5,930,767 A | * | 7/1999 | Reber et al. | 705/26 |
| 5,939,699 A | * | 8/1999 | Perttunen et al. | 235/462.01 |
| 6,484,933 B1 | | 11/2002 | Zimmerman et al. | |
| 6,641,050 B1 | * | 11/2003 | Kelley et al. | 235/492 |
| 2003/0120920 A1 | * | 6/2003 | Svensson | 713/168 |

FOREIGN PATENT DOCUMENTS

| | | | |
|---|---|---|---|
| WO | WO 00/04711 A1 | | 1/2000 |
| WO | WO 01/35334 A1 | * | 5/2001 |
| WO | WO 02/063602 A1 | | 8/2002 |

* cited by examiner

*Primary Examiner*—Hosuk Song
*Assistant Examiner*—Beemnet W Dada

(57) ABSTRACT

A visual tag having an imprinted image, a processor for calculating a response string corresponding to the content of the imprinted image and a challenge string, and a changeable screen to display the response string in machine-readable symbols. An authentication device reads the displayed symbols, and authenticates the displayed contents corresponding to the challenge string. The challenge string is generated either according to a random generator within the authentication device, or according to a real-time clock. A plurality of tags or objects can be authenticated and spotted within an image. The tag can also authenticate inputted messages and credentials.

30 Claims, 12 Drawing Sheets

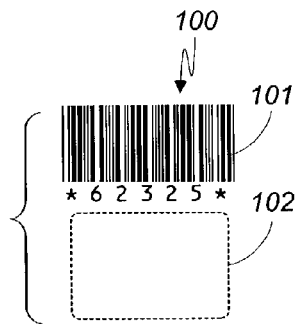
FIG. 2A
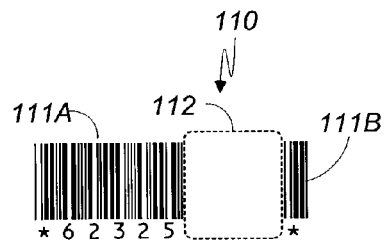
FIG. 3A
FIG. 2B
FIG. 3B
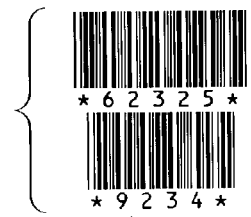
FIG. 2C
FIG. 3C
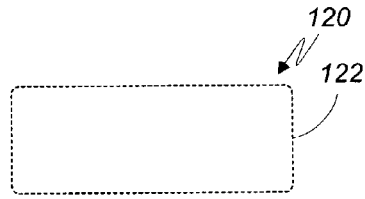
FIG. 4A
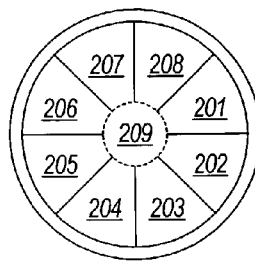
FIG. 5A
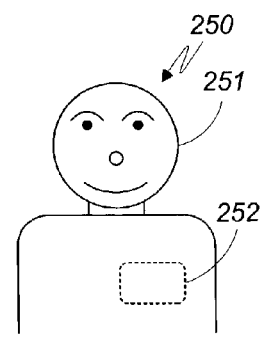
FIG. 6
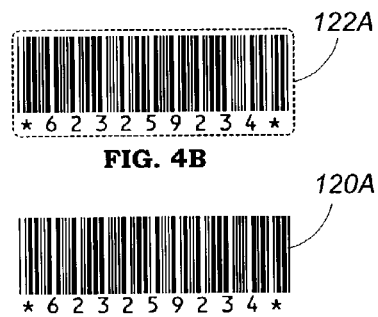
FIG. 4B
FIG. 4C
| 201 | RED | START |
|---|---|---|
| 202 | WHITE | 0 |
| 203 | WHITE | 0 |
| 204 | GREEN | 6 |
| 205 | BLUE | 2 |
| 206 | YELLOW | 3 |
| 207 | BLUE | 2 |
| 208 | PURPLE | 5 |
| 209 | WHITE | 0 |
FIG. 5B
| 201 | RED | START |
|---|---|---|
| 202 | WHITE | 0 |
| 203 | WHITE | 0 |
| 204 | GREEN | 6 |
| 205 | BLUE | 2 |
| 206 | YELLOW | 3 |
| 207 | BLUE | 2 |
| 208 | PURPLE | 5 |
| 209 | BLACK | 1 |
FIG. 5C

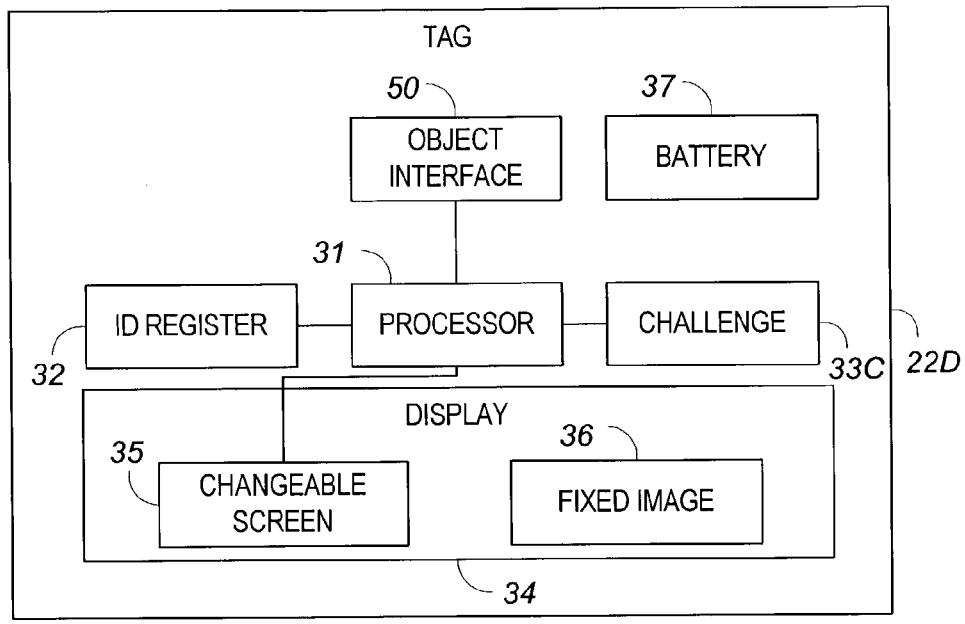
FIG. 15
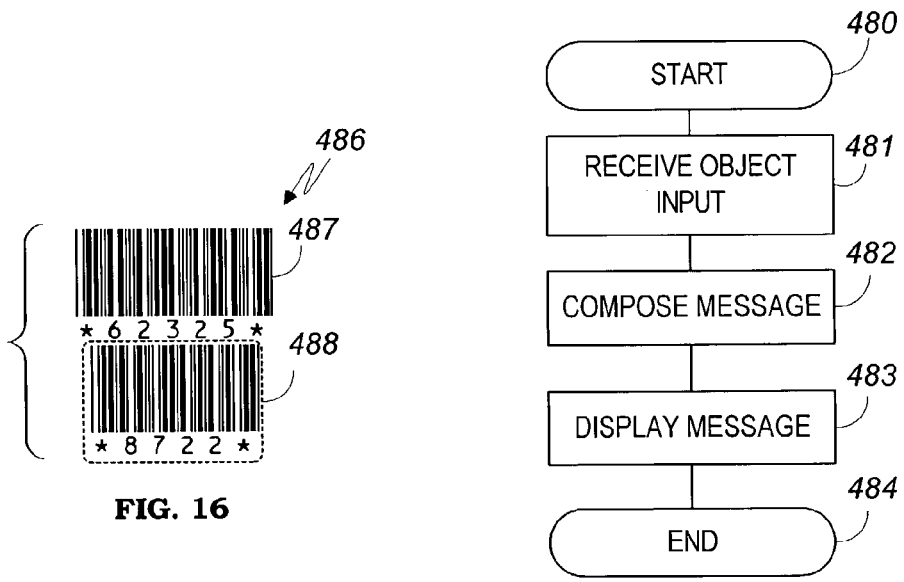
FIG. 16
FIG. 17

SYSTEM, METHOD, AND APPARATUS FOR VISUAL AUTHENTICATION

CROSS-REFERENCE TO RELATED APPLICATIONS

Applicant hereby claims priority of U.S. Provisional Patent Application U.S. Ser. No. 60/442083, filing date Jan. 20, 2003, entitled "SYSTEM METHOD AND APPARATUS FOR VISUAL AUTHENTICATION".

BACKGROUND OF THE INVENTION

The present invention relates to authentication, and, in particular, to the authentication of visual symbols.

Authentication is the verification of the identity of a person, object, or process. In a communication system, authentication verifies that messages come from their stated source. In an access control system, physical access may require authentication by photo ID, password, or biometric data. Paper document authentication is often made by checking a handwritten signature. Credit card transactions involve PIN or signature to authenticate the cardholder.

With growing threats from both crime and terrorism, authentication becomes more and more important, and the authentication methods need to be more and more robust to withstand sophisticated attacks. Thus, for example, a password transmitted over an unsecured network is not considered reliable for authentication, because it can be intercepted and replayed by an attacker. The science of cryptography offers well-known methods such as challenge-and-response, encryption, and digital signatures, to support authentication that is sufficiently robust to withstand practical attacks.

Another relevant aspect with respect to the present invention is machine-reading of visual symbols representing information or data. A common non-limiting example of visual symbols is a block of printed text, which requires a sophisticated OCR (optical character recognition) algorithm for reading by machine. To facilitate machine-reading, special fonts have been developed, as can be seen on the bottom of bank checks and in the type used to emboss credit cards. To further facilitate machine-reading, the one-dimensional and two-dimensional bar-codes, and a circular color code have been developed. The two-dimensional bar-code offers higher information density and error-correction capability, while the circular color code, such as the one described in PCT publication WO00/04711, has proven to be easily-identifiable within large images, where a multiplicity of tags bearing such a code is embedded within an image that contains additional information, such as a digital photograph of a crowd.

Visual symbols appear on product packaging or are printed on tags attachable to a product, document or person. The machines used to read visual codes are special-purpose laser or CCD scanners, or general-purpose digital still or video cameras that acquire an image containing the visual code and send it to a computer for image processing.

A major advantage of prior-art printed visual codes is the ease and low cost of production. However, this very advantage makes such codes also vulnerable to unauthorized duplication. Various efforts have been made to make such duplication harder, for instance by covering the printed code with an opaque layer that is seen through by infrared scanners. However, none of the methods of the prior art offers robust protection against a sophisticated attacker who uses affordable, off-the-shelf equipment to read and reproduce the symbols.

SUMMARY OF THE INVENTION

Definitions

By "tag" is meant a small standalone device that is easy to carry or wear by humans or to attach to objects, and which includes a display showing machine-readable symbols. The display may use any technology to represent the symbols, such as printing, front-lit or back-lit liquid crystal (LCD), light emitting diodes (LED), light bulbs, or electrically-controlled mechanical shutters.

By "scanner" is meant any device that can read and digitize machine-readable symbols. Non-limiting examples are barcode laser or LCD scanners, digital video or still cameras, and flatbed scanners.

By "authentication" is meant the verification of the content displayed on a tag. Such tag will be presented by a person or attached to an object, and its displayed content will preferably include indicia identifying the related person or object, or the identity of a group to which such a person or object belongs, and/or credentials granted to that person or object by a third party.

By "challenge-and-response" is meant a session wherein a "challenge string" is generated, and wherein cryptographic methods are used to calculate a "response string" corresponding to the challenge string, usually in combination with a secret key. It is presumed that the cryptographic scheme used will make it impractical for an attacker intercepting sessions of challenge-and-response to derive the secret key or otherwise be able to predict the response string corresponding to a new challenge string. It is also presumed that challenge strings will not repeat, or will repeat with very low probability. Both presumptions are supported by methods known and common in the art. By "string" is meant a digital representation of data.

OBJECTS OF THE PRESENT INVENTION

The present invention seeks to provide systems and functionalities for overcoming the vulnerability of visual symbols displayed on prior art tags to being copied or reproduced.

Another object of the present invention is to reduce the amount of visual space used for authentication.

Additionally, the present invention seeks to allow the authentication of individual objects and persons within a crowd and visually spot authenticated and unauthenticated tags or objects within an image of the crowd.

Further, the present invention seeks to disable authentication of other than the legitimate user or assigned object.

Still another object of the present invention is to include messages and credentials in an authenticated visual message.

BRIEF SUMMARY

Briefly, the present invention adds a processor-controlled changeable screen to a tag, in order to display a response string that authenticates the content of the tag. The response string is generated with respect to either a challenge string received by the tag, or to a time stamp retrieved from a real-time clock included in the tag. An authentication device scans the tag, reads it contents, calculates the expected response string, and compares the readout response with the expected response to decide authenticity. Repeated readouts can accumulate to provide reliable authentication even if the size of the changeable screen is small and allows displaying only a minimal amount of data. Part of the changeable screen can be used to display a changeable message, while the response displayed on the other part of the screen will then authenticate the message as well. The authentication device can output an image of a scene, and spot authenticated and unauthenticated objects and tags within the image.

According to a preferred embodiment of the present invention, there is provided a visual authentication system including:

a tag having imprinted image displaying a fixed character string in machine-readable symbols, a processor to calculate a response string corresponding to the fixed character string and to a challenge string, and a changeable screen controlled by the processor to display a changeable image showing the response string in machine-readable symbols; and an authentication device having: a scanner to read from the tag both the imprinted image and the changeable image; an image processor to transform the imprinted image into a first character string and to transform the changeable image into a readout response string; and an authentication processor to calculate an expected response string corresponding to both the first character string and the challenge string, compare the readout response string to the expected response string, and output the comparison result.

According to another embodiment of the present invention, the challenge string is generated by the authentication device, and the authentication device also includes a transmitter to transmit the challenge string to a receiver included in the tag. Alternatively, the tag includes a tag real-time clock to provide the challenge string. In the latter case, the authentication device also includes a real-time clock substantially-synchronized with the tag real-time clock, and the expected response string will be calculated with respect to a predetermined time interval from the time read from the device real-time clock. In this case, the readout response string will be compared to the expected response string by checking whether the readout response string matches the expected response string corresponding to an instance related to the time interval.

Additionally, in accordance with another embodiment of the present invention, a changeable screen with limited space can still provide a response string of a desirable length via a series of snapshots, and the image processor of the authentication device will then compose the readout string from the series of snapshots. Alternatively, a changeable screen with limited space can still provide reliable authentication by repeating a series of challenge-and-response sessions, and concluding a positive authentication result only upon reaching a predetermined number of successful matches between consecutive readout response strings and their corresponding expected response strings.

Preferably, according to another embodiment of the present invention, the authentication device can scan a plurality of tags within a single image, and then calculate and output the authentication result for each tag of the plurality. Furthermore, the authentication device can then output an image containing the plurality of tags, and visually spot each individual tag according to the authentication result associated with that tag. Additionally, according to still another embodiment of the present invention, the authentication device can also identify and spot objects within the image that do not bear a tag at all.

According to another embodiment of the present invention in the case of a tag that is attachable to an object, the tag includes a tamper-resistant removal sensor, and the tag is disabled upon detecting that it is being removed from the object. Additionally or alternatively, according to a preferred embodiment of the present invention, a tag used to authenticate a person will be enabled only upon entry of a valid PIN or biometric measurement into the tag through a user interface.

According to still another embodiment of the present invention, the tag displays and authenticates additional information, such as a message inputted by the person or object or credentials granted by a third party. Such additional information is retrieved by the tag from an object interface or credentials register and are included in the data displayed on the changeable screen as well as in calculating the response string displayed on the screen.

BRIEF DESCRIPTION OF SEVERAL VIEWS OF THE DRAWINGS

FIGS. 2A–C are schematic illustrations of a first embodiment of the changeable screen of the tag of FIG. 1B.

FIGS. 3A–C are schematic illustrations of a second embodiment of the changeable screen of the tag of FIG. 1B.

FIGS. 4A–C are schematic illustrations of a third embodiment of the changeable screen of the tag of FIG. 1B.

FIGS. 5A–C are schematic illustrations of a fourth embodiment of the changeable screen of the tag of FIG. 1B.

FIG. 6 is a schematic illustration of a fifth embodiment of the changeable screen of the tag of FIG. 1B.

FIG. 15 is a schematic block diagram of a tag incorporating an object interface.

FIG. 16 is a schematic illustration of an exemplary display for the tag of FIG. 15.

FIG. 17 is a flowchart illustrating the operation of the preferred embodiment of FIG. 15.

DETAILED DESCRIPTION OF THE INVENTION

FIRST PREFERRED EMBODIMENT

Figure 1A:
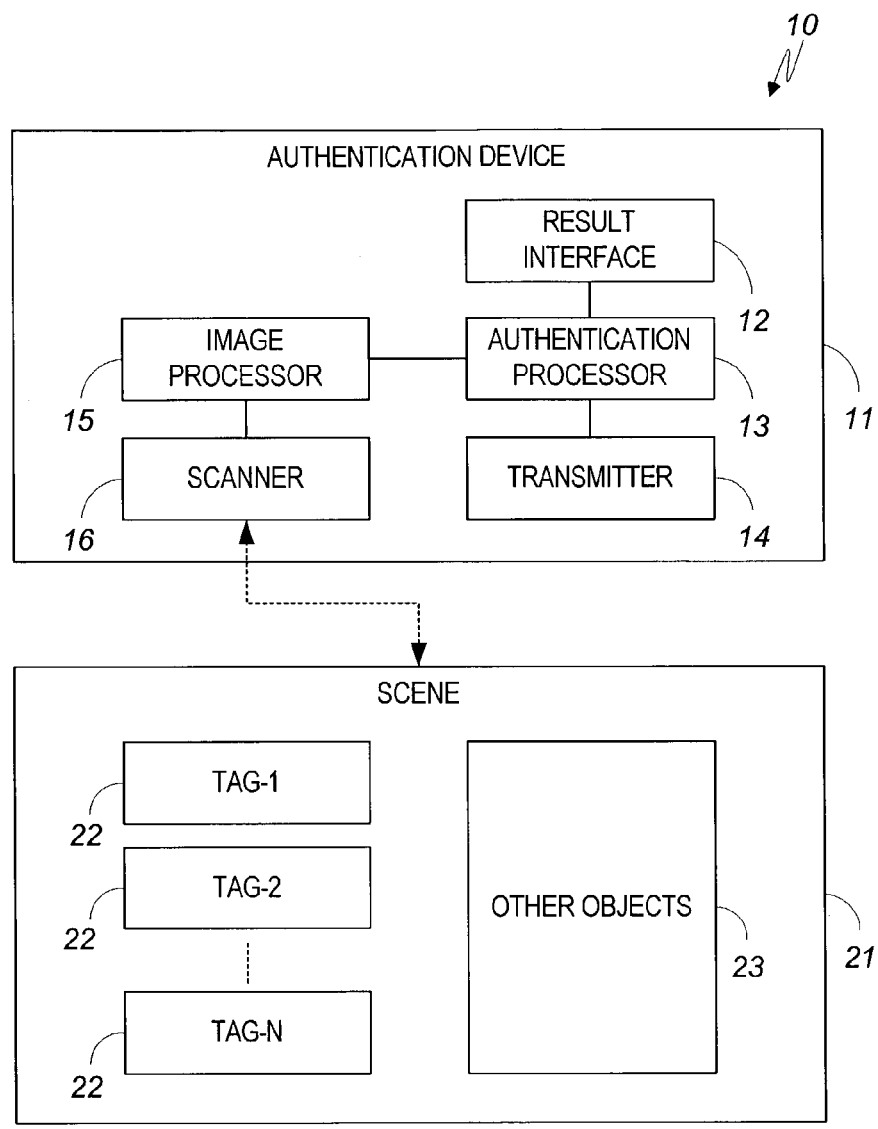
FIG. 1A is a schematic block diagram of a preferred embodiment of the present invention.
Figure 1B:
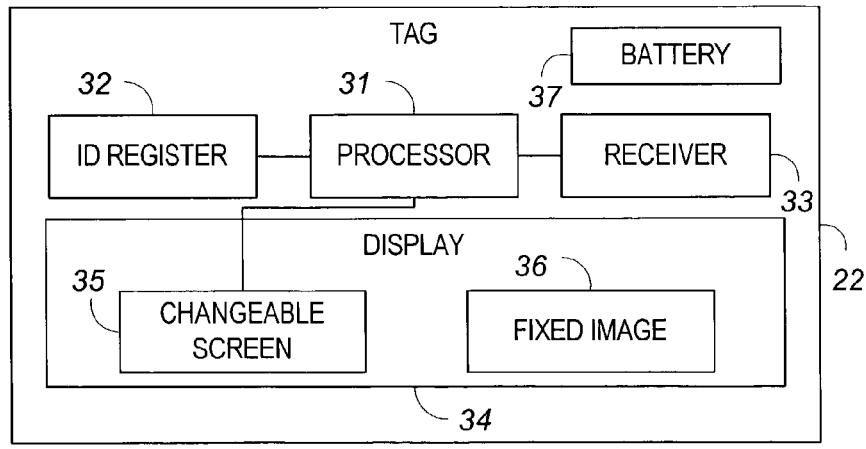
FIG. 1B is a schematic block diagram of the tag from the preferred embodiment of FIG. 1A.

Reference is made to FIGS. 1A–B that illustrate a general layout of a first preferred embodiment of the system according to the present invention. Visual authentication system 10 is composed of authentication device 11 that scans a scene 21. Scene 21 contains one or more tags 22 that show, on their display 34, machine-readable visual symbols. Scene 21 may also include objects 23 other than tags. Scanner 16 is preferably a laser or CCD scanner or a digital video or still camera that observes scene 21 and converts it to a digital image. Image processor 15 analyzes the digital image to identify tags 22 and separate them from one another and from other objects 23, and convert the symbols included in the tags into their digital representation. In environments where the symbols are hard to interpret automatically, such as when using a digital camera with insufficient resolution or when operating under poor lighting, image processor 15 may include a user interface for allowing a human operator to aid in the identification of tags and interpretation of symbols. Authentication processor 13 generates a challenge string, preferably using a random number generator, to be transmitted by wireless transmitter 14 for reception by receivers 33 of tags 22. Wireless transmitter 14 and receivers 33 can communicate via electromagnetic or sound waves, including, but not limited to radio-frequency (RF), infrared (IR), and sonic (audible) or ultrasonic waves. Further, authentication processor 13 receives the digital symbol representation from image processor 15 and decides whether each tag 22 has been positively or negatively authenticated, and this decision is reported to result interface 12. Result interface 12 presents the authentication results either to a human attendant via an audiovisual message, or sends a digital signal to another machine, such as to an electrically-controlled turnstile that allows access to a person carrying a positively-authenticated tag. Result interface 12 will also optionally channel additional image-related data such as the image itself or the full data read from the tag.

Tag 22 is to be attached to an object to be authenticated such as a person, a pet, a car or a piece of luggage. It includes receiver 33 that receives a challenge string from transmitter 14. Processor 31 calculates a response string from the combination of the received challenge string and a secret key included in ID register 32. Display 34 includes a mandatory changeable screen 35 that displays the response string calculated by processor 31, and an optional fixed image 36, for example a printed label, that identifies tag 22 and its bearer. The image read by scanner 16 from tag 22 contains the symbols displayed on both changeable screen 35 and fixed image 36. ID register 32 contains identification data of tag 22, as well as a secret key that is unknown to third parties and takes part in calculating the response string displayed on changeable screen 35. Changeable screen 35 will preferably use LCD or LED elements, but electrically-controlled mechanical shutters or any other kind of electrical or electrically-controlled displays are also possible. Battery 37 energizes the other tag units described above.

It will be appreciated that authentication device 11, as well as its equivalents described below with respect to alternative preferred embodiments, can be implemented in various physical and logical forms. For example, all its blocks may be implemented as distinct hardware components and then packed within a single housing; alternatively, it can be built of modular components, for example: scanner 16 and transmitter 14 can be packed in one housing and placed in one location, and communicate via a network with image processor 15, authentication processor 13 and result interface 12 that are materialized as software modules on a personal computer. Thus, the components of authentication device 11 shall be viewed as logical blocks embedded in any combination within physical components rather than the physical components themselves. As previously noted, transmitter 14 and receivers 33 can use electromagnetic RF or IR waves as well as sound waves in the sonic or ultrasonic spectrum for communicating the challenge string.

FIG. 2A–FIG. 6 illustrate examples of display 34 of FIG. 1B. FIGS. 2A–C illustrate a two-line barcode display. FIG. 2A illustrates display 100, whose fixed image 101 contains exemplary tag identification data "62325". Changeable screen 102 is initially blank. Upon calculation by processor 31 of a response string, for example "9234", screen 102A shows this response, which yields the complete image 100A ready to be scanned by scanner 16 and authenticated by authentication processor 13.

FIGS. 3A–C relate to a single-line barcode. Initially, view 110 shows fixed image 111A+111B and blank changeable screen 112. The calculated response is then displayed on the changeable screen to show image 112A, which yields image 110A to be scanned and authenticated by authentication device 11.

FIGS. 4A–C show another example, wherein display 34 has no-fixed image 36. Thus display 120 contains only changeable screen 122, which is originally blank. When the response "9234" has been generated with respect to the combination of the device ID "62325" retrieved from register 32 and the random challenge string received by receiver 33, the two parts of the data (i.e., ID and response) are appended within display 122A, yielding the final image 120A, which is ready to be read and authenticated by authentication device 11.

FIGS. 5A–C relate to another visual coding method, the circular colored symbols described in PCT publication WO00/04711. The following description uses arbitrary color codes that do not adhere to any specific color coding scheme of the prior art, and is presented as an example only. Display 200 of FIG. 5A includes a fixed image represented by eight color-coded slices 201–208, and a single changeable screen area 209 that can be set to either black or white under the control of processor 31. FIGS. 5B–C illustrate an exemplary representation of the tag's fixed ID number "0062325", by the slice colors white, white, green, blue, yellow, blue and purple, using the red color in slice 201 as a convention for identifying the reading starting point in clockwise direction. The difference between FIGS. 5B and 5C is that changeable screen 209 shows white and black responses, respectively, in response to different challenge strings received by receiver 33. This embodiment highly simplifies and reduces the cost of the changeable screen part 209 of display 200, but requires repeated successes in challenge-and-response sessions to obtain reliable authentication, as will be elaborated in the description of FIG. 9, below, or can be used for multi-snapshot signal representation, as described with respect to FIG. 23, below.

FIG. 6 relates to another case 250, wherein changeable screen 252 operates in conjunction with a fixed image 251 that is characteristic of the object to be authenticated, such as the digital representation of a fingerprint, retina, or face, all well-known in the art. Thus, the response displayed on changeable screen 252 may be calculated to correspond to the received challenge in combination with known and selected characteristics of object 251 as recorded in ID register 32.

It will be appreciated that any type of symbolic representation of data that is machine readable can be used for displaying data on display 34 for reading by scanner 16. For example, regular alphanumeric characters can be also used, in which case image processor 15 needs to include OCR (optical character recognition) capabilities.

Single Tag Scenario

Figure 7:
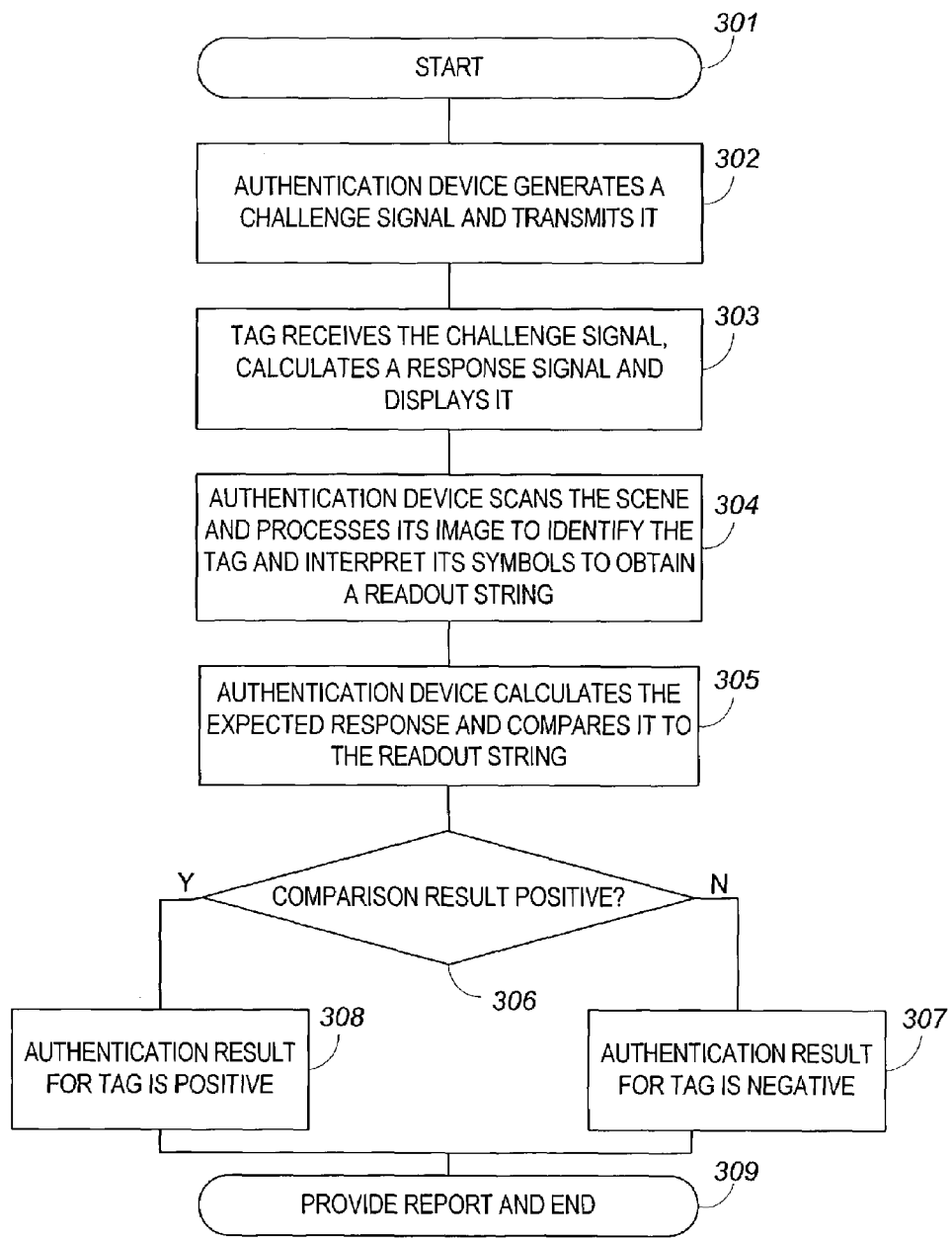
FIG. 7 is a flowchart illustrating the operation of the preferred embodiment of FIGS. 1A–B in a single-tag scenario.

Reference is now made to FIG. 7, which illustrates the operation of system 10 of FIG. 1A, for a scene 21 containing a single tag 22. In step 301, authentication device 11 starts to authenticate the tag in scene 21. In step 302, authentication processor 13 generates a random challenge string and transmits it via transmitter 14. In step 303, tag 22 receives the challenge string through its receiver 33, and its processor 31 calculates the response string and displays it on changeable screen 35. In step 304, authentication device 11 operates its scanner 16 to scan scene 21, and image processor 15 is employed to identify tag 22 and transform the displayed symbols thereon into a readout string of digital ASCII characters. In step 305, authentication processor 13 calculates the expected response according to the employed challenge-and-response scheme, and then compares the expected response with the readout string. If in step 306 the comparison is found positive, then the result of the authentication process is positive in step 308, otherwise it is negative in step 307. In step 309 the positive or negative result, optionally including the tag information, is reported to a human or machine client via result interface 12, and the process is concluded.

Multiple Tag Scenario

Figure 8:
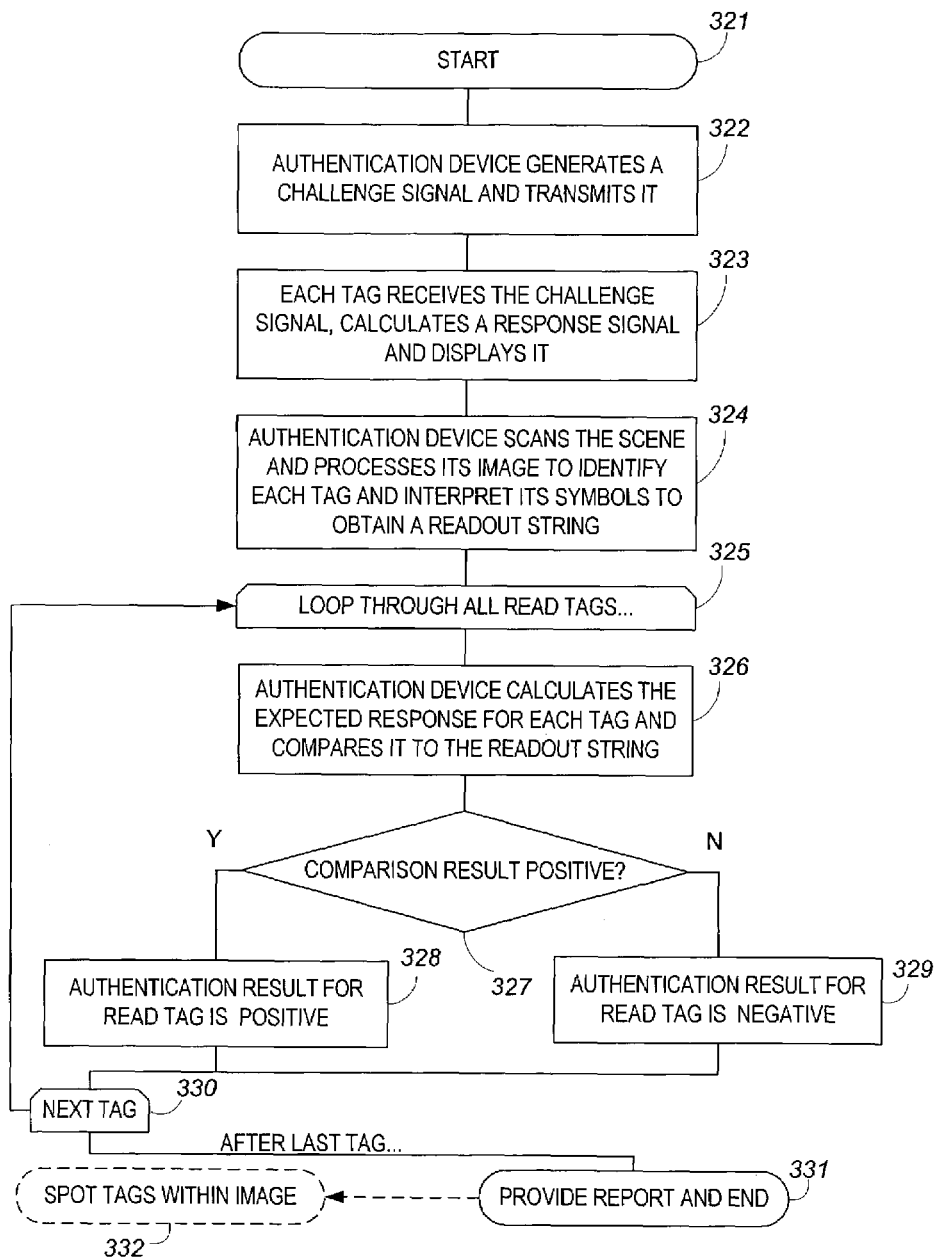
FIG. 8 is a flowchart illustrating the operation of the preferred embodiment of FIGS. 1A–B in a multiple-tag scenario.

Reference is now made to FIG. 8, which illustrates the operation of system 10 of FIG. 1A, with respect to a scene 21 containing a plurality of tags 22. In step 321 authentication device 11 starts to authenticate the tags in scene 21. In step 322, authentication processor 13 generates a random challenge string and transmits it via transmitter 14. In step 323, each tag 22 within scene 21 receives the challenge string through its receiver 33, and its processor 31 calculates the response string with respect to its own ID register 32 and displays this response string on its changeable screen 35. In step 324, authentication device 11 operates its scanner 16 to scan scene 21, and image processor 15 is employed to identify all tags 22 within scene 21 and interpret the displayed symbols into readout strings of digital ASCII characters. In step 325, a loop trough all read tags is initiated. In step 326, authentication processor 13 calculates the expected response for the current tag, and then compares the expected response with the readout string of same tag. If in step 327 the comparison is found positive then the result of the authentication process is positive in step 328 for the current tag, otherwise it is negative in step 329 for the current tag. In step 330 the procedure loops to authenticate the next tag. After concluding the checking of all tags, then in step 331 the positive and/or negative results for all tags in scene 21 is reported to a human or machine client via result interface 12, along with the details of the respective tags, and the process is concluded. In the case of a human client, result interface 12 would preferably display in an additional step 332 the entire scene image and then identify the authenticity status of each tag within the scene by spotting each tag within the image using a color code, e.g. a green frame for positively-authenticated tags and a red frame for negatively-authenticated ones. This way, the operator can easily detect the location and identity of the positively and negatively authenticated objects, which may be highly advantageous in some applications, e.g. authenticating a crowd.

Repeated Challenge-and-Response Sessions

In some cases, for space or cost considerations, it may be desirable to reduce the size of changeable screen 35. The extreme case has been demonstrated in FIG. 5A, where only one bit of information is represented by changeable screen 209, which can be set to either black or white. This offers a degraded level of authentication, because the response can be guessed with a substantial chance of success. To overcome this potential weakness, the present invention allows a repeated number of challenge-and-response sessions in order to reach a desirable level of confidence in the validity of the authentication.

Figure 9:
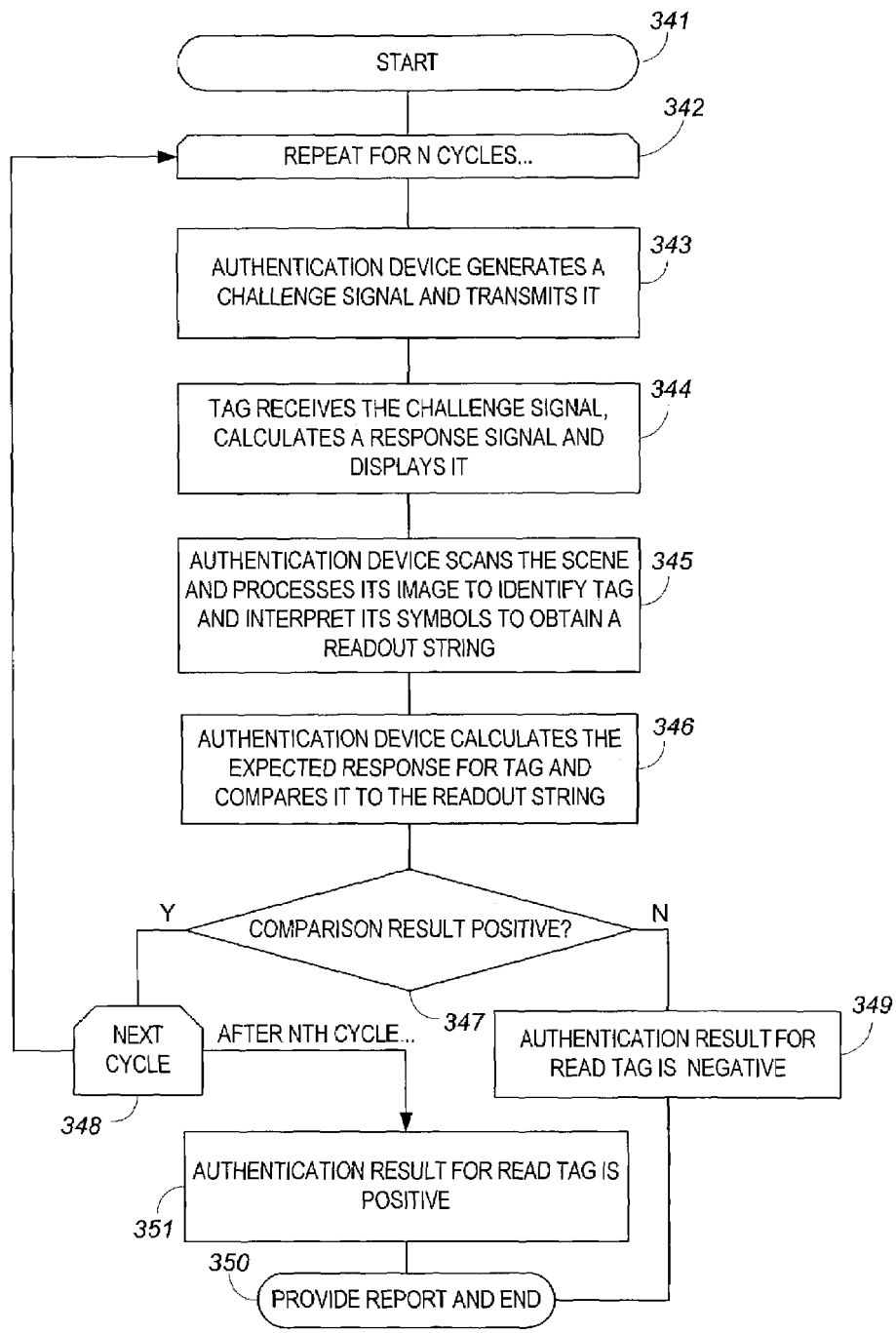
FIG. 9 is a flowchart illustrating the operation of the preferred embodiment of FIGS. 1A–B in a multiple-scan mode.

Reference is made to FIG. 9, which illustrates the operation of system 10 of FIG. 1A in repeated-scan mode for a scene containing a single tag 22 (similar to the setup illustrated in FIG. 7). A similar logic applies to a multiple tag scenario comparable to the one of FIG. 8. In step 341, authentication device 11 is called to authenticate the tag in scene 21. In step 342, a loop of N cycles is initiated, wherein N is selected to provide a predetermined level of confidence. For instance, if the display of FIG. 5A is used, for which the probability of correctly guessing is ½, then selecting N=10 will reduce the probability of correctly guessing to $\frac{1}{1024}$. Steps 343–347 are similar to steps 302–306, respectively, of FIG. 7. However, a negative result will be interpreted as negative in step 349 whereas a positive result will initiate another loop from step 348 to step 342, until the full N loops have been completed positively. Only if N loops have been completed positively will the tag be considered positively authenticated in step 351 for purposes of the report and conclusion in step 350. The collection of N readouts is referred to as a "pattern". That is, a positive authentication results when a "readout pattern" matches a calculated "expected pattern", where each individual expected string matches the corresponding readout string.

It will be appreciated that repeated scans may be called also in environments where scanning errors are probable, for rechecking negative authentication results.

Replacing Transmitted Challenge Strings with a Real-Time Clock

System 10 of FIGS. 1A–B uses a transmission of a random challenge as a trigger for calculating a response string. Such transmission and reception may incur high costs as well as interference problems. This can be overcome by using a real-time clock as a source for non-repeating challenge strings.

Figure 10A:
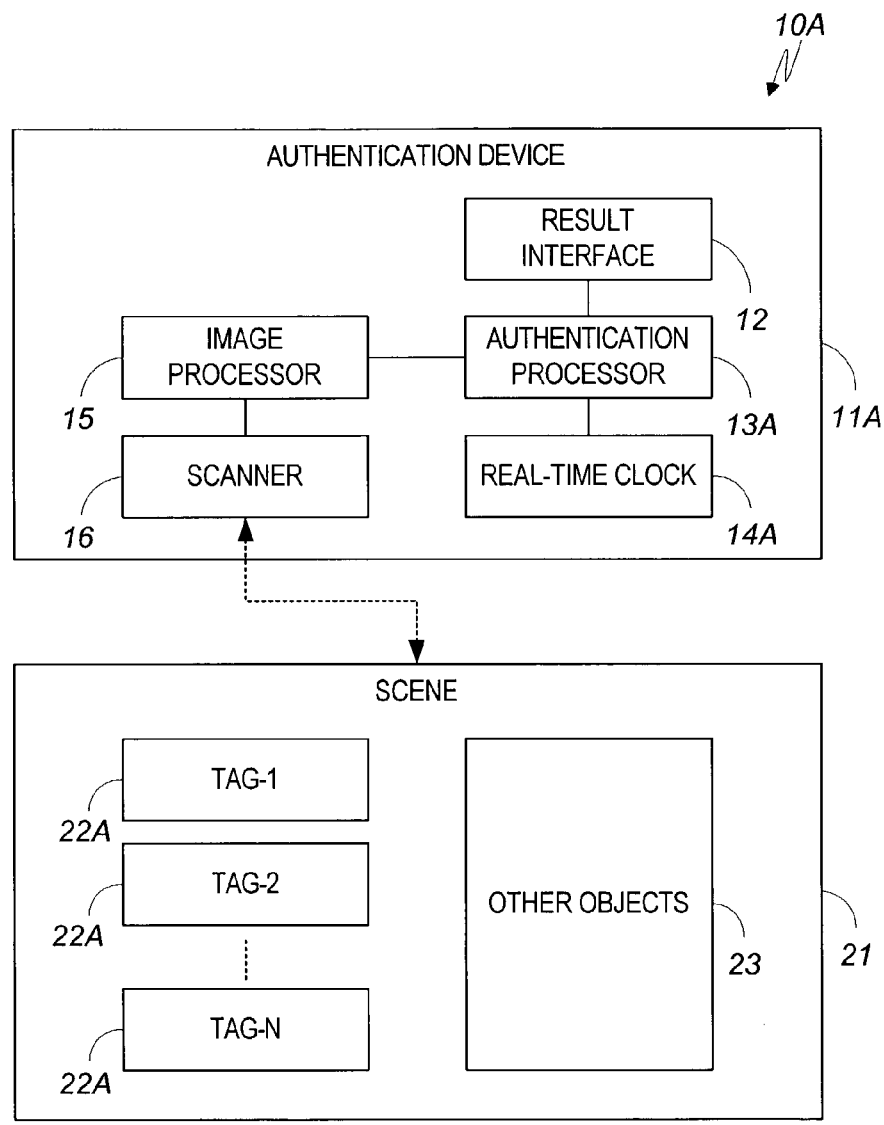
FIG. 10A is a schematic block diagram of a second preferred embodiment of the present invention.
Figure 10B:
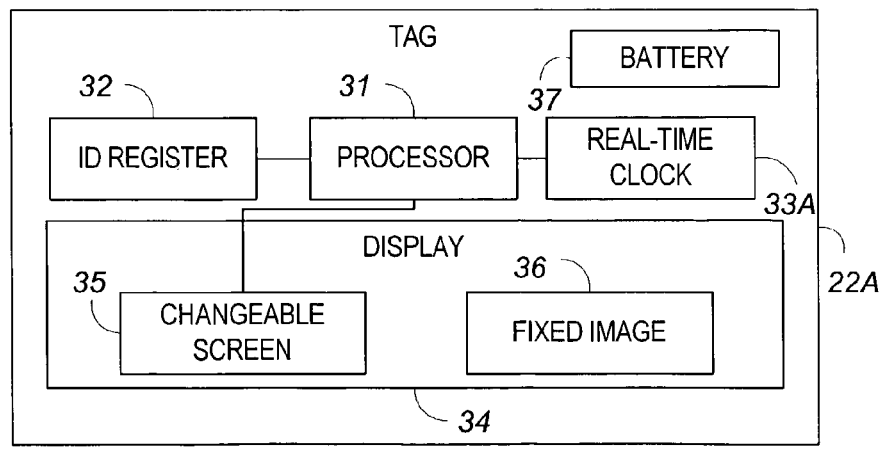
FIG. 10B is a schematic block diagram of the tag of the second preferred embodiment.

FIGS. 10A–B illustrate an alternative embodiment to the one of FIGS. 1A–B, employing a real-time clock. System 10A is similar to system 10, except that authentication processor 13A does not generate a random challenge string, and transmitter 14 is replaced by real-time clock 14A that generates an input for authentication processor 13A for calculating the expected response. On the other end, tag 22A replaces receiver 33 with real-time clock 33A to provide the challenge string. The current timestamp (for example, in the form YYYYMMDDhhmmss having a numerical representation of the year, month, day, hour, minute and second, respectively) now serves as a non-repeating challenge string, which, with reasonably-accurate clocks at both ends, will provide a substantially-synchronized challenge. However, to compensate for a small clock shift that may accumulate over time, authentication processor 13A may need to calculate and compare a series of expected responses, for, say, 30 seconds before and after its current clock setting, prior to reporting a negative result for the authentication. In case that repeated scanning is employed (the embodiment of FIG. 9), the examined series will relate to patterns of consecutive responses rather than a single response. The consecutive responses can relate to arbitrary time intervals among them; for example, 10 scans made within 30 minutes with arbitrary (but known) time intervals among them (not necessarily equally-spaced) provide a pattern of readouts that can be analyzed to determine the authenticity of the tag.

Figure 11:
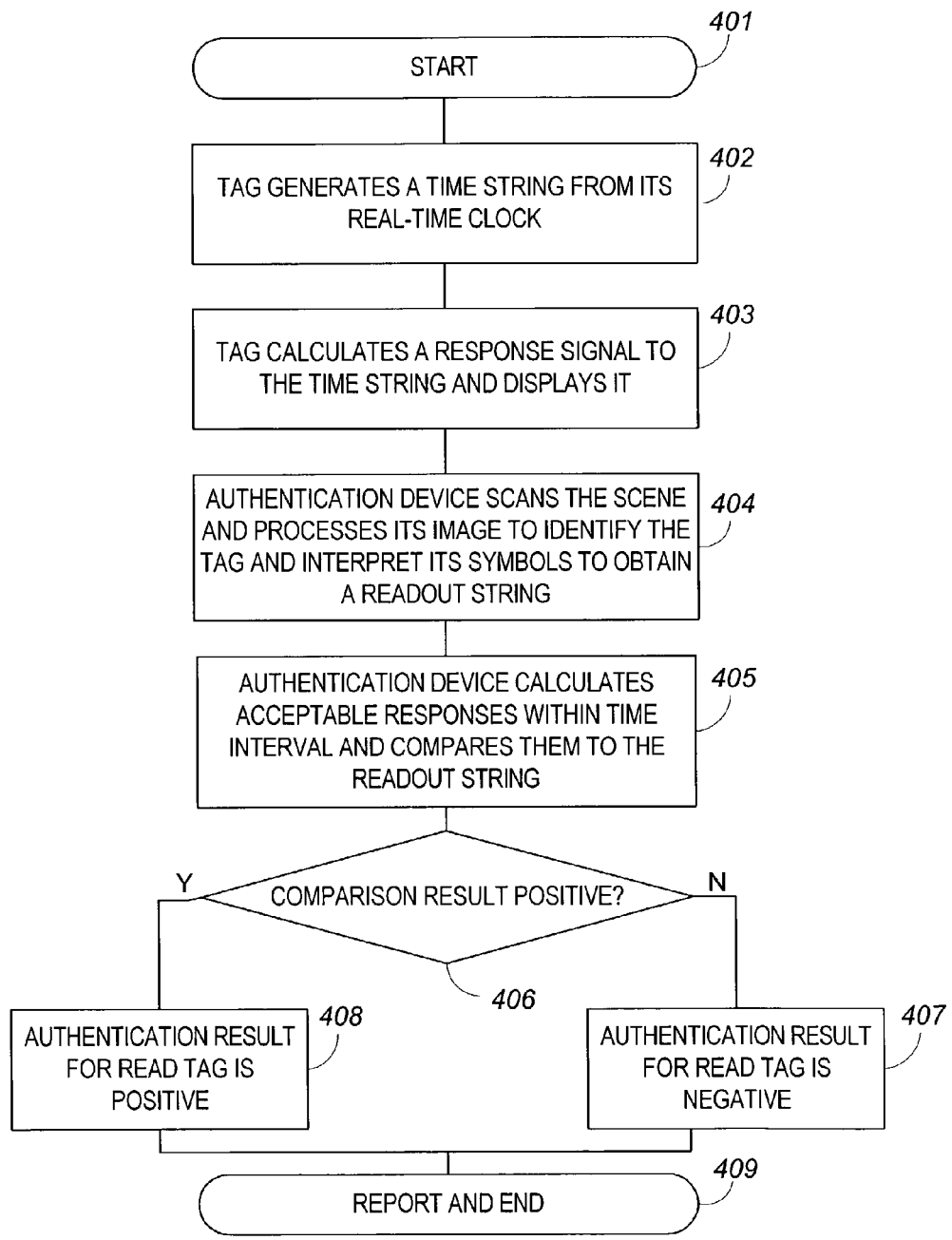
FIG. 11 is a flowchart illustrating the operation of the preferred embodiment of FIGS. 10A–B.

FIG. 11 illustrates the operation of the embodiment of FIGS. 10A–B with respect to a single-tag scenario similarly to that of FIG. 7. In step 401, authentication device 11A starts to authenticate the tag in scene 21. In step 402, tag 22A generates a time string from its real-time clock 33A, and in step 403 its processor 31 calculates the response string respective to the time string and displays it on changeable screen 35. In step 404, authentication device 11 operates its scanner 16 to scan scene 21, and image processor 15 is employed to identify tag 22 and interpret the displayed symbols into a readout string of digital ASCII characters. In step 405, authentication processor 13A calculates 61 possible expected responses for 61 timestamps ranging from {[current time]–[30 seconds]} until {[current time]+[30 seconds]}, using a 1 second increment, to compensate for the possible time shift due to clock inaccuracy, and then compares the possible expected responses with the readout string. If in step 406 the comparison is found positive for any of the 61 strings (each such comparison relates to an "instance"), then the result of the authentication process is positive in step 408. Otherwise (when all 61 comparisons related to all 61 instances are negative), the result is negative in step 407. In step 409 the positive or negative result is reported to a human or machine client via result interface 12, and the process is concluded.

It will be appreciated that the same approach can also be applied for replacing the random challenge string with a real-time clock signal in the multiple-tag scenario of FIG. 8 and in the multiple-scan embodiment of FIG. 9. As before, the latter case requires examining patterns of expected results instead of single expected results.

It is also to be appreciated that the time interval around the read time string (±30 seconds in the above example) can, in some cases, be zero (i.e., only one instance needs to be examined), if the clock synchronization between the tag and the authentication device is assured, e.g. by using extremely accurate crystals or by receiving universal time signals broadcasted by a third party. In this case a single expected response string (or a single pattern of expected responses in case of repeated scans) will suffice.

Managing the Risk of Tearing

The tags of the present invention can be attached to objects in order to authenticate the objects. Under some circumstances, there is a risk that a tag will be moved from one object to another, thus improperly authenticating the other object. For instance, if a tag is used to authenticate a license plate of a car, then moving the tag to another license plate may jeopardize the validity of the authentication. The present invention includes an enhancement for this case, based on detecting the tearing of the tag from the assigned object and disabling the tag if tearing has been detected.

Figure 12:
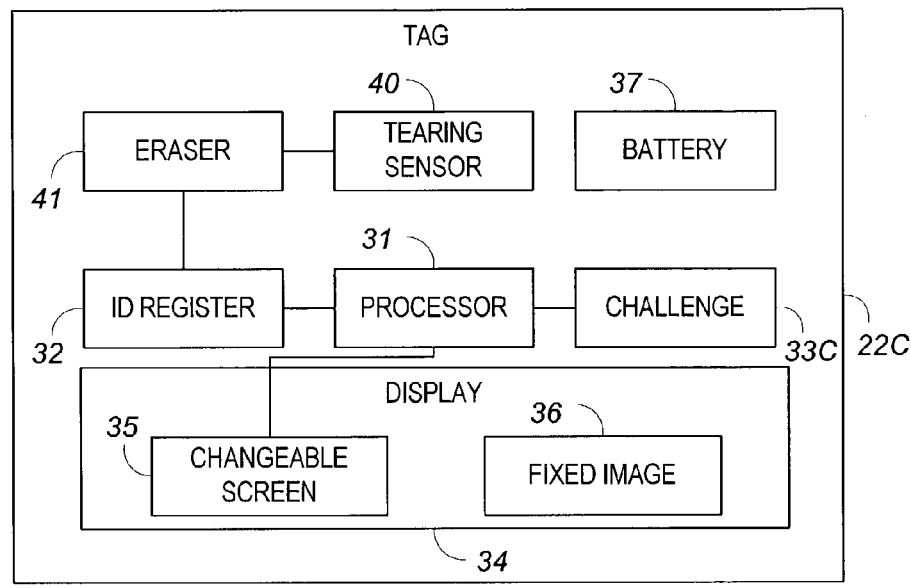
FIG. 12 is a schematic block diagram of a tag incorporating a tearing sensor.

Reference is made to FIG. 12, which illustrates enhanced tag 22C. Tag 22C includes challenge function 33C which is a placeholder for either challenge receiver 33 of FIG. 1A or real-time clock 33A of FIG. 10A. The new elements added to tag 22C are tearing sensor 40 and eraser 41, for erasing the content of ID register 32 in case of tearing, thus making tag 22C inoperable for authentication when moved to a different object. Tearing sensor 40 includes mechanical, electrical and/or electronic elements to detect when tag 22C is separated from its assigned object. Two examples are presented below with respect to FIGS. 14A–B. Eraser 41 can be implemented either as a software routine in processor 31, or as a separate, special-purpose circuit designed to destroy the contents of ID register 32, for example by exposure to excessive voltage.

Figure 13:
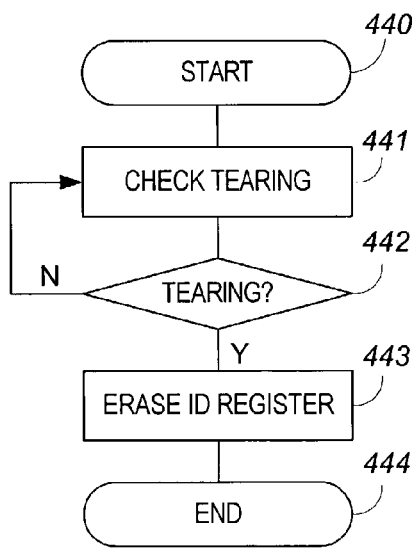
FIG. 13 is a flowchart illustrating the operation of the tearing sensor of FIG. 12.

FIG. 13 illustrates the operation of sensor 40 and eraser 41. At the start in step 440, the tag is properly attached to its assigned object, for example a car, and tearing sensor 40 is activated. In step 440 tearing sensor 40 checks tearing status and if found negative in step 442, then the check is repeated indefinitely. If, however, tearing is detected positively in step 442, then in step 443 eraser 41 is activated to erase the content of ID register 32, thus disabling tag 22C at the end in step 444.

Figure 14A:
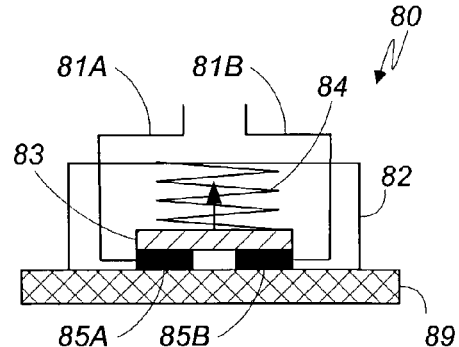
FIGS. 14A–B are schematic illustrations of examples of tearing sensors related to the tag of FIG. 12.

FIG. 14A illustrates an embodiment 80 of tearing sensor 40 of FIG. 12. Housing 82 forms part of tag 22C and cannot be separated therefrom without destroying tag 22C. Housing 82 contains two contact points 85A and 85B, which are electrically-connected by magnetic conductor 83. Wires 81A and 81B connect contact points 81A and 81B to eraser 41, which continually monitors the electrical resistance between these wires. The car's metal body 89 attracts magnetic conductor 83 and overcomes spring 84 which tries to pull magnetic conductor 83 away from contact points 85A–B. However, when tag 22C, along with housing 82, is removed from car body 89 even momentarily, spring 84 pulls magnetic conductor 83 away from contact points 85A–B, which changes the electrical resistance between wires 81A–B as measured by eraser 41. This triggers eraser 41 to erase the contents of ID register 32.

Figure 14B:
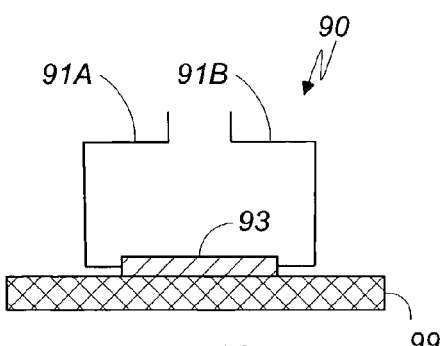

FIG. 14B illustrates an alternative embodiment 90 for tearing sensor 40 of FIG. 12. In this case, wires 91A–91B are connected by a conducting plate 93, which is attached by a strong adhesive to object 99. The resistance between wires 91A–B is monitored by eraser 41. When tag 22C is removed from object 99, conducting plate 93 will be broken, which triggers eraser 41 to erase the contents of ID register 32.

Tearing sensors can be applied also when the tag of the present invention is to be attached to a human. For example, a bracelet that must be broken for removal from one's wrist may include conductive materials to serve as a tearing sensor. Then, if a tag connected to the bracelet is used to identify special access rights or privileges granted personally to the wearer (e.g., in connection to a specific event or for specific services), such rights will not transferable to others because the tag will become inoperable upon removal from the wrist of its original wearer.

It will be appreciated that the disabling of the tag can also be effected in other ways besides erasing the contents of ID register 32, as presented above. Other ways include, but are not limited to changing the contents of ID register 32, sending a disable command to processor 31, or disconnecting any critical link among the participating components. Furthermore, when the tag is disabled by tearing sensor 40, processor 31 can display on changeable screen 35 a special coded message that signals to authentication device 11 that the tag has been torn, which will be reported through result interface 12, for example to call for high-priority intervention.

Authenticating Messages Gnerated by an Object

The embodiments described so far have authenticated static information, such as identification of a person or a car. However, sometimes it is desirable to authenticate dynamic data, such as the temperature of an object or the vote of a person. FIGS. 15-16 illustrate another embodiment of the present invention, wherein object interface 50 is added to allow an object to which the tag is attached or related, to input a message. Non-limiting examples of object interface 50 include a keypad for a human user, and a status sensor (e.g. a thermometer) for a material object. The object message, (such as a message "8" designating a voter's choice) is appended to the tag ID retrieved from ID register 32, is displayed on part of changeable screen 35, and is added to the response calculation at both tag 22D and authentication processor 13. FIG. 16 illustrates such a display, in the format of the two-line display embodiment of FIGS. 2A–C. Display 486 contains in its top line 487 fixed ID information "62325", and its changeable screen 488 now displays the message "8" and the response string "722" which is calculated on the basis of the combination of the tag ID 487, the message "8", and the challenge string from register 33C. FIG. 17 illustrates the operation of tag 22D in the embodiment of FIG. 15. At the start in step 480, the object composes the message (for example, the tag holder enters his vote "8" via keypad 50). In step 481 the input is received by processor 31. In step 482, processor 31 composes a message that includes both the message and the corresponding calculated response string. In step 483 the message is displayed on changeable screen 35 for reading and checking by authentication device 11, and the procedure ends in step 484.

It will be appreciated that the tag message can be of any kind or sort. As another example, a sensor may detect whether a suitcase has been opened or not, send its conclusion to object interface 50, and the tag 22 attached to that suitcase then displays and authenticates the status of the suitcase's security. It will furthermore be understood that the tag message can be displayed in clear (i.e., plaintext), as is detailed for the "8" vote in the foregoing example and illustrated in FIG. 16, or can be encrypted by processor 31, such as by using the secret contents of register 32 as a key. Following this, the message is decrypted by authentication processor 13, using the corresponding key. This way, the messages can be authenticated, while being protected from unauthorized third parties. Furthermore, ID information displayed on screen 35 (such as in the embodiment of FIGS. 4A–C) can similarly be encrypted, authenticated, and protected. In cases where the number of possible messages is small (for example, when using the tag to vote one of eight selections between "1" and "8"), then the selection does not need to be displayed at all, and can be derived from checking the readout response string in comparison with the eight possible expected response strings calculated for the eight possible votes, and the one which matches will implicitly identify the selected vote. This maintains confidentiality in the voting process.

It is noted that although the enhancements that include an object message and/or encrypt the display content have been described with respect to the embodiment of FIGS. 1A–B, the same enhancements can be applied to all alternative embodiments described herein.

User-to-Tag Authenication

When tag 22 is employed to authenticate a human user, the user may wish to prevent others from using his or her tag if the tag is lost or stolen. For this purpose, object interface 50 of a variation of FIG. 15 includes a human interface for receiving a user authentication input, such as a small keypad for keying in a PIN, or a fingerprint sensor for identifying the user via biometrics. In this case, ID register 32 also includes user authentication data such as the PIN or biometric details of the assigned user, and processor 31 enables the tag, for instance to operate changeable screen 35, only upon validating that the user's PIN or biometric details entered through object interface 50 match the corresponding data from register 32.

Group Authentication

The previous embodiments and examples have included identification information as part of the scanned and authenticated data. It is noted that such identification information can be specific to an individual tag and its associated object, or can relate to a group of tags carrying the same identification information. In this case, each tag or its bearer is authenticated as a member of the group, without making any distinction among the members.

The extreme case of group authentication is when all tags provided and programmed by a certain authority are considered as a single group. In this case, display 34 need not provide any identification information, and the proper response string displayed on changeable screen 35 authenticates tag 22 and the associated object as belonging to the group. The group is then distinguished from other groups by the issuer and the specifics of the cryptographic scheme used to create the secret contents of ID register 32 and calculate the response by processor 31.

Implicit Identification

If the number of the authenticated tags or tag groups is small compared to the size of the response string, then the identity of the group can be omitted from the tag and derived from the response string. For example, if for a certain challenge string all tags of groups A, B and C are expected to respond with "78651", "19802" and "33787", respectively, then "A", "B" and "C" can be eliminated from display 34 of FIG. 1B, and derived by authentication processor 13 from the received response.

Authentication of Credentials

The embodiments described so far relate primarily to authenticating an object, and optionally to additionally authenticating inputs provided by that object. The following embodiment allows the authentication of credentials expressly granted to an object by a third party. For example, a car may be granted a pass permit onto a toll road, or a person may be granted an entrance ticket to a movie theater or a subway system. The embodiment described with respect to FIGS. 18–22 below relate to the example of a toll booth application.

Figure 18:
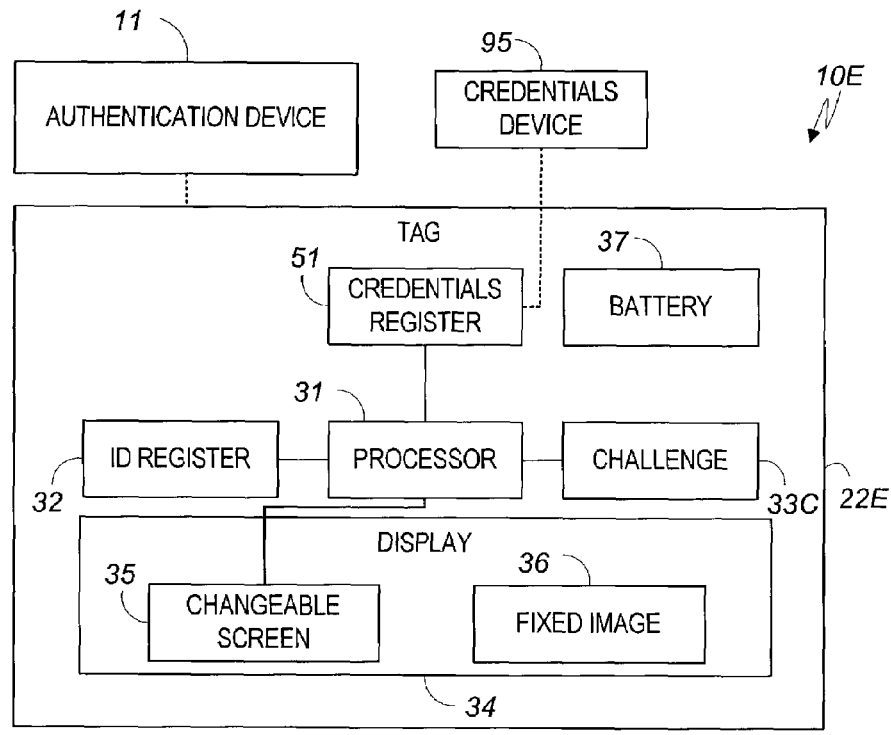
FIG. 18 is a schematic block diagram of an embodiment of the present invention interfacing with a credentials device.
Figure 19:
FIG. 19 is a schematic illustration of an exemplary display for the tag of FIG. 18.

Reference is made to FIGS. 18–19. System 10E now includes also credentials device 95, e.g. a cash register at a toll booth, where a driver stops his car to buy a road usage pass whose code is, for example, "7622". After the purchase transaction is completed, credentials device 95 enters the usage code "7622" into credentials register 51 via a wired or wireless communication link. Fixed image 36 contains the vehicle license-plate data. Processor 31 receives a challenge string from register 33C and calculates a response string, for example "13695", from the combination of the device ID from ID register 32, the usage code "7622" retrieved from credentials register 51, and the challenge string retrieved from register 33C. Display 35 then displays the composite message 489 with the content "762213695" to be scanned and checked by authentication device 11, which is placed at a checkpoint along the toll road. Authentication device 11 scans, interprets, and decomposes the message read from display 34 into the tag ID, service code "7622" and authentication response "13695". Authentication device 11 then transmits the ID information, usage code, and authentication results through result interface 12 to an access control system (not shown), which responds with a green light or an alarm.

Preferably, ID register 32, processor 31 and credentials register 51 are embedded in a tamper-proof chip, to prevent forging of credentials.

Figures 20, 21:
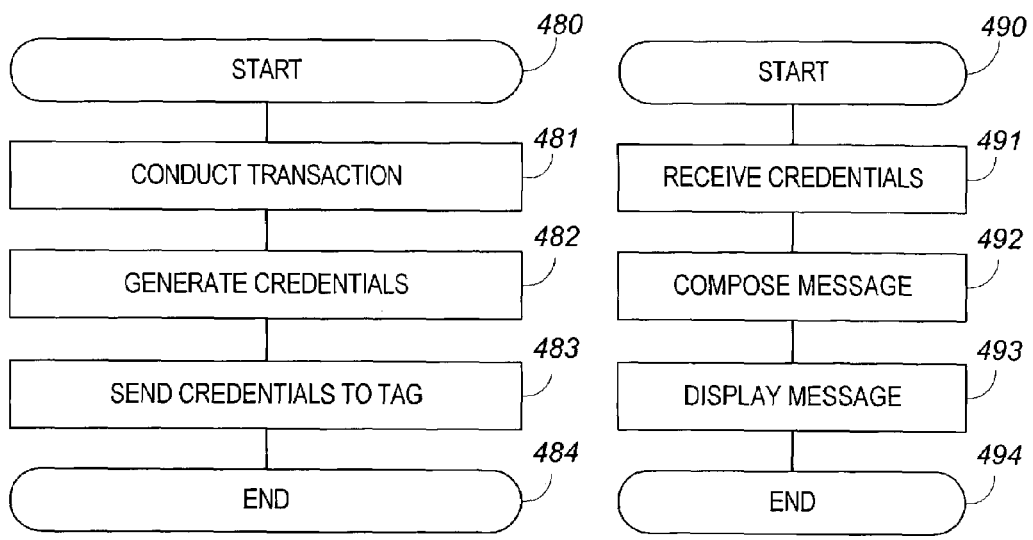
FIG. 20 is a flowchart illustrating the process of registering credentials within the embodiment of FIG. 18.
FIG. 21 is a flowchart illustrating the process of composing a message showing credentials within the embodiment of FIG. 18.

FIG. 20 illustrates the process of entering the credentials into tag 22E. At the start in step 480 the driver has stopped at a toll booth and has specified his route. In step 481 he makes the appropriate payment, which in step 482 generates credentials in the form of a usage code, for example "7622". In step 483 this code is transmitted to the tag and put into credentials register 51, and the process ends in step 484, after which the car leaves the toll booth.

FIG. 21 illustrates the message composition on changeable screen 489 of tag 22E. In step 490 the procedure starts after the procedure of FIG. 20 ends in step 484. In step 491 the credentials generated by credentials device 95 are received in credentials register 51. In step 492, processor 31 combines the content of ID register 32, challenge register 33C, and credentials register 51 to calculate a response string (for example "13695"), and then combines the usage code and response string into a single message "762213695". In step 493 this message is displayed on changeable screen 489, for reading by authentication device 11.

Figure 22:
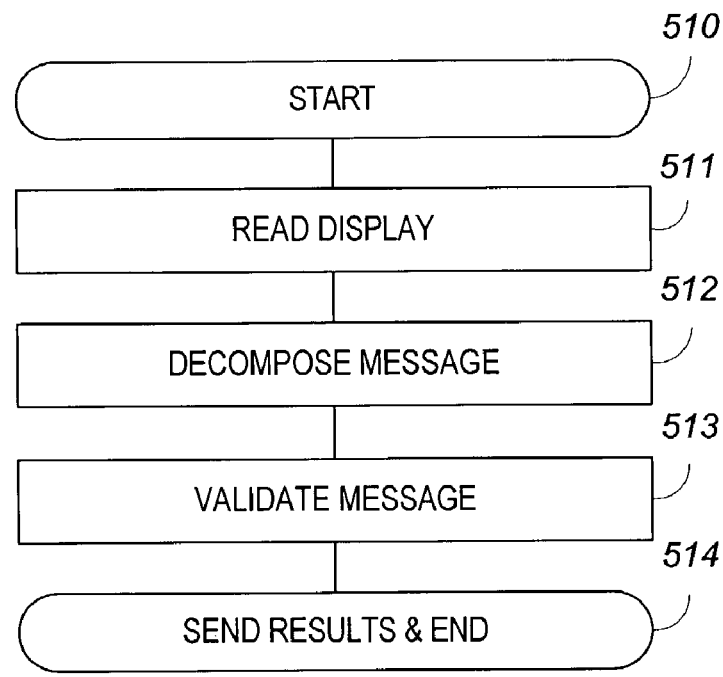
FIG. 22 is a flowchart illustrating the process of authenticating a message showing credentials within the embodiment of FIG. 18.

FIG. 22 illustrates the operation of authentication device 11 with respect to tag 22E of FIG. 18, and also with reference to FIG. 1A. At the start in step 510, the car carrying tag 22E has approached authentication device 11. In step 511, scanner 16 scans display 34 to read both fixed image 36 and changeable screen 489, and image processor 15 transforms the read symbols into their digital representation. In step 512 the readout message is decomposed into the car ID (from fixed image 36) as well as the usage code "7622" and the response string "13695" (both retrieved from changeable screen 489). In step 513, authentication processor 13 calculates the expected response, taking into account the challenge string, the read card ID and the credentials (in this example, the read usage code "7622"); the expected response is then compared to the readout response "13695", to determine whether the authentication result is negative or positive. In step 514, the card ID, usage code and authentication results are placed in result interface 12 to be sent to an access-control system (not shown) and the procedure ends.

It will be appreciated that credentials can be of all sorts and kinds. Thus credentials device 95 and credentials-granting transaction 481 can pertain to situations including, but not limited to: access permits for an employee; rights designated for a senior citizen; an address or routing instructions for a package. Any data that identifies specific rights, privileges, or instructions for a person or an object may be assigned to that person or object via a tag according to the present invention. In addition, the same procedure can authenticate consumption of credentials. For example, credentials register 51 can obtain a certain amount of electronic value via credentials device 95. Such value can represent, for example, money, subway tickets, or toll-road mileage. In the case of consumable credentials, the challenge signal received via receiver 33 will also incorporate an instruction to deduct a certain amount from the electronic value stored in credentials register 51, and the response signal will contain an extended message including a confirmation of the value deduction. The composition of messages securely confirming value consumption is well known to those familiar with the art of smart-card stored value payment, and will not be elaborated here. It is noted that a special case of value consumption is value cancellation, such as for a one-time ticket to an event that is cancelled upon entry, where both the ticket and cancellation are authenticated at the entry gate. A similar application holds in other cases, such for a toll-road pass. Thus, when relating to authentication of credentials, the present invention also provides the authentication of the consumption of credentials that represent value.

A Series of Snapshots Representing a Single Response String

The foregoing description related to the embodiment illustrated in FIG. 9 has shown how a changeable screen of minimal size and cost can still provide a satisfactory level of authentication through multiple challenge-and-response sessions. However, multiple readouts obtained from reading a series of signals can alternatively represent a single response to a single challenge. For example, a 1-bit changeable screen 35, such as screen 209 of FIG. 5A, may show a timed series of 20 snapshots of black and white signals, to display any selected response between 0 and 1,048,575 (that is, 2^20-1) in response to a single challenge signal. It will be appreciated that the time interval between consecutive signals can be reduced to allow high-speed reading of 10–20 readouts, the reduction being limited only by the technical performance of changeable screen 35 and scanner 16 and the related processing circuitries.

Figure 23:
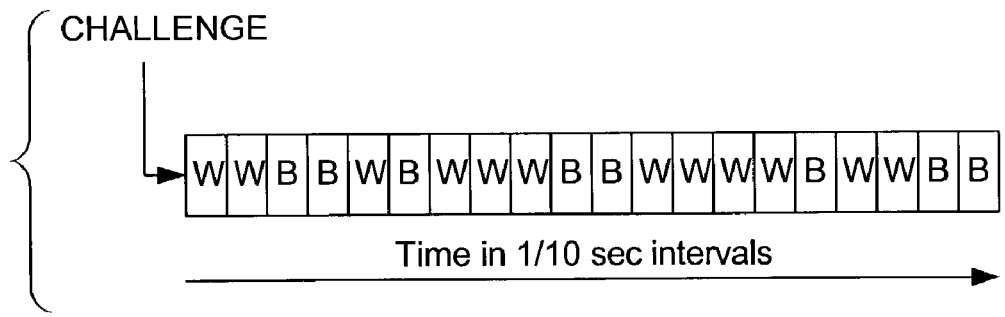
FIG. 23 is a schematic illustration of a response string composed of a series of signals.

FIG. 23, with reference also to FIGS. 1A–B, illustrates a response signal composed of a series of 20 timed black and white snapshots of screen 35, the first starting immediately upon receiving the challenge signal by receiver 33, and the rest following in 1/10 second time intervals. Scanner 16 observes screen 35 for 2 seconds to make 20 synchronized readings. In the example of FIG. 23, the twenty read snapshots are represented by the string "WWBBWBWW-WBBWWWWBWWBB", where "B" and "W" represent black and white readouts, respectively. This string is transformed by image processor 15 into the binary string 00110100011000010011, which is converted by authentication processor 13 into the decimal value 214547. This value is compared to the expected response calculated by authentication processor 13, to determine the authenticity of tag 22.

Making repeated readouts in order to reach a desired level of authentication certainty (either in the form of repeated challenge-and-response sessions or as a series of visual signals representing a single response string) has been previously described in association with binary changeable screens like the one of FIG. 5A. It will be appreciated that a similar approach can be applied for other changeable screens. For example, if two decimal digits are allocated to represent responses on changeable screen 112 of FIG. 3A, then the probability that an attacker will correctly guess the proper response is 0.01. This may be reduced to 0.0001 or to 0.000001, if two or three readout sessions, respectively, are repeated.

Multiple Authentication Sessions at Dieffernt Checkpoins

The embodiment of FIGS. 9 and 23 employed repeated challenge-and-response sessions or repeated snapshot scans within a single authentication event, to obtain reliable authentication in spite of a minimal response string provided by a small changeable screen 35. Alternatively, in environments where tags are expected to be checked very often, for example secure car license plates passing many checkpoints along the highways, repeated scans may be replaced by repeated authentication sessions. Thus, if a car has a secure license plate such as the one described below with respect to FIG. 24, there is a 0.1 chance for a forged license plate to pass successfully a single checkpoint by guessing the response string, but only 0.000001 chance to pass six such checkpoints without being caught in any of them. In such environments, even the single-scan authentication described in FIGS. 7–8, can provide reliable authentication for small changeable screens such as the one of FIG. 24.

Secure License Plate

Figure 24:
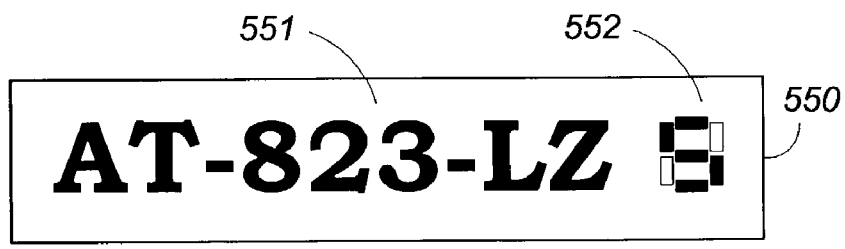
FIG. 24 is a schematic illustration of a secure license plate in accordance to the present invention.

Reference is now made to FIG. 24, which describes the display of a secure car license plate constructed in accordance to the present invention. Display 550 includes fixed image 551, which shows an exemplary license plate number "AT-823-LZ", and changeable screen 552, which shows an exemplary response string "5". Changeable screen 552 uses a 7-segment LCD or LED display to show digits in the range 0–9. As already discussed above, if the license plate is expected to be checked often at many checkpoints having authentication devices such as authentication device 11 of FIG. 1A, this display will provide a cost-effective choice. Otherwise, in environments where highly-reliable authentication is required at a single checkpoint, a larger changeable screen with more symbols, and/or a dot matrix display for a richer character set, can be used for changeable screen 552, or the arrangements of repeated challenge-and-response sessions or a series of snapshots described with respect to FIGS. 9 and 23 above, may be called.

A secure license plate will preferable utilize tamper-resistant logic described with respect to FIGS. 12–14B, to prevent transferring the plate from its original car to another.

Authentication of Objects

The preferred embodiments described above focus on authenticating a tag, and using this to authenticate the object that bears the tag. The embodiment of FIG. 6 also relates to characteristics read from the object, while FIGS. 12–14B relate to ensuring that a tag cannot be moved from the assigned object in order to fraudulently authenticate another object. The following embodiment adds a further enhancement for object authentication beyond only tag authentication, and specifically prevents an object that does not bear a tag at all to bypass the authentication process.

Figure 25:
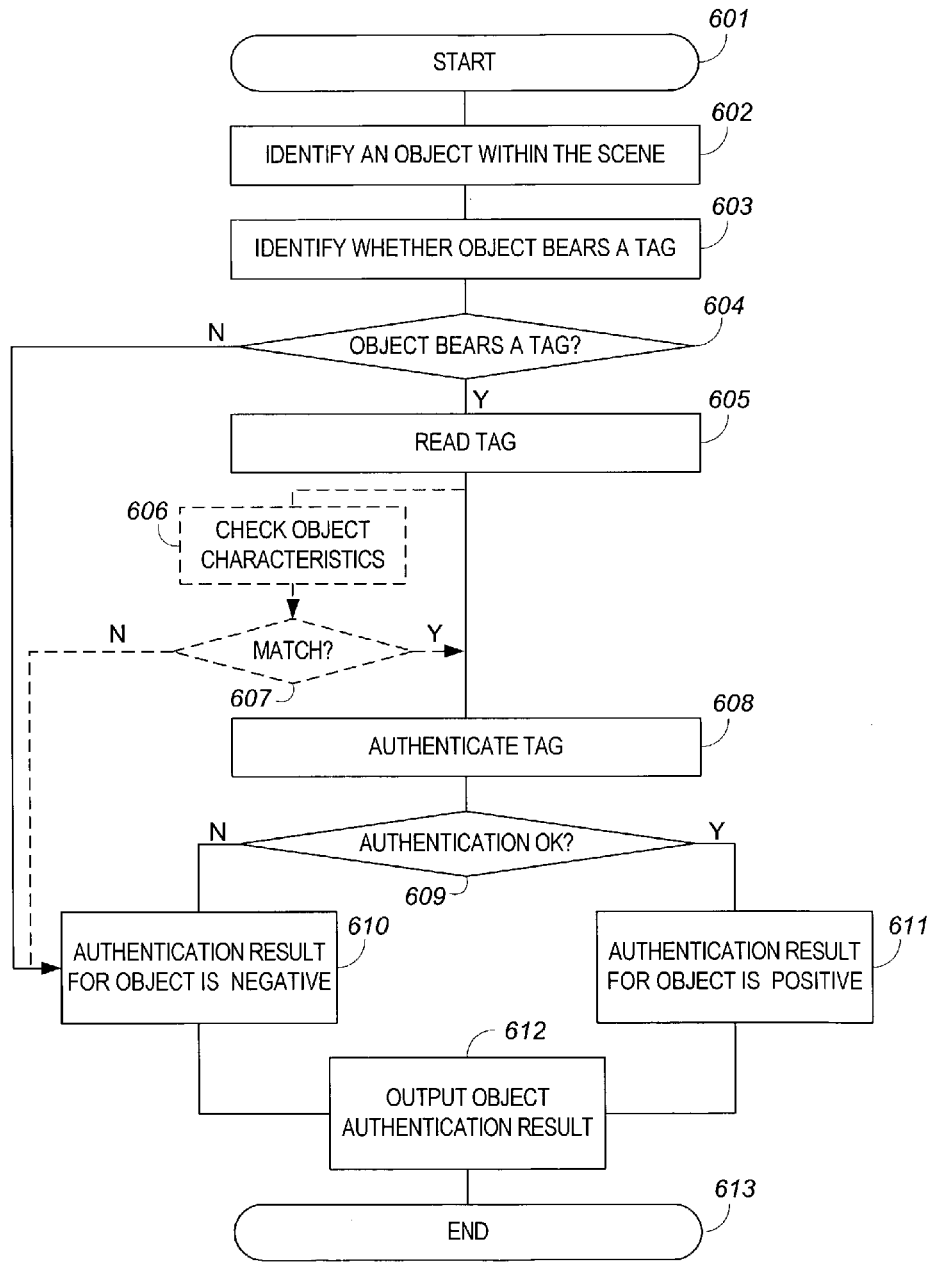
FIG. 25 is a flowchart illustrating the operation of a preferred embodiment of the present invention for authenticating an object bearing a tag.

Reference is now made to FIG. 25, with reference also to FIGS. 1A–B. At the start in step 601, a digital representation of scene 21 has already been acquired by scanner 16. In step 602, an object, rather than a tag, is recognized by image processor 15. The object recognition is carried out by image recognition techniques known in the art to identify objects by shape, color or motion. For example, if authentication device 11 is used in a toll road to authenticate cars by their tags 22, then at this stage the car rather than the tag will be identified. In step 603, image processor 15 seeks the image of the tag within the object image to determine whether the object bears a tag. If no tag is found, then in steps 604 and 610 the object will be assigned a negative authentication result. Otherwise, in step 605 tag 22 is read by image processor 15 to transform the tag's image into a readout string. In step 608 the authenticity of the tag is checked by authentication processor 13 as described according to any of the preferred embodiments described above. If in step 608 the tag has been positively authenticated, then step 609 will lead to a positive authentication of the object in step 611, otherwise the object will be negatively authenticated in step 610. Steps 606 and 607 represent an optional enhancement, wherein the direct link between step 605 and step 608 is cancelled. In step 606 the object characteristics are first acquired, for example from combining information derived from the object's image and other sensors (such as a measuring device, for example a scale), to end-up with a result such as "a white passenger car weighing 4100 pounds"; further in step 606, the acquired characteristics are compared to expected characteristics coded within the tag's readout string and possibly also retrieved from a database accessible to authentication processor 13 (not shown in FIG. 1A.). Then, if the expected characteristics are, still in the current example, "a brown truck weighing 10000 pounds", step 607 will conclude a mismatch, leading to negative object authentication in step 610. If, alternatively, the expected characteristics are "a white passenger car weighing 4000 pounds", this is considered to be close enough to the acquired characteristics to allow positive match in step 607, leading to the next step 608 of tag authentication. In step 612, the object authentication results are outputted, preferably by spotting negatively and positively-authenticated objects within an image of scene 21. In step 613, the object authentication process ends, possibly by proceeding to authenticate the next object within same scene.

After-the-Fact Authentication

The embodiments presented so far have been described in the context of real-time authentication, whereby the authentication process by authentication device 11 operates its authentication processor 13 as soon as scanner 16 has acquired the image of scene 21. It is noted, however, that the authentication procedure can also take place at a later time. In particular, the authentication procedure can operate "on-line" or "off-line". For example, scanner 16 in the form of a still or video camera (or, in this case, even a conventional, film-based still or movie camera in combination with a film scanner or flatbed photograph scanner), may record a scene including objects or persons identified by tags 22, whose changeable screens 35 are responding to transmitted or time-based challenge strings that are also recorded with the image; later, perhaps only if a specific need for authentication raises, the acquired stills or footage are brought to image processor 15, and authentication processor 13 completes the authentication of the tags 22 included in the scene, and preferably also spotting the authenticated and unauthenticated objects or tags within the image, as described in the various embodiments above.

Embedding the Tag Within Other Devices

The tag of the present invention can be made in all shapes, sizes, types, and configurations. For example, in an alternative preferred embodiment, a tag according to the present invention forms part of a cellular telephone, employing the telephone as a communication link for receiver 33. In another preferred embodiment, the tag is incorporated in the face of a battery-powered smart credit card, offering portability and convenience to the cardholder, with possible integration with the smart card functions.

Challenge-and-Response

The processes described herein make use of challenge-and-response processes that are well-known in the art and which are commonly used for authentication purposes. The following example is presented for clarification only, and is described with respect to the preferred embodiment of FIGS. 1A–B.

a. A secret master key is generated centrally and is provided to all authentication processors 13; these units are trusted by the system, in the present example, as secure against access and tampering by unauthorized parties.

b. The master key is used to encrypt the ID of each tag 22, and both the clear (plaintext) and encrypted ID are stored in ID register 32. The tag ID encrypted by the master key becomes the tag's secret key. The encryption scheme is chosen to protect the master key from being derivable from the contents of register 32, even in the event that the clear ID and tag's secret key have become compromised. Encryption schemes with such a property are well-known in the art.

c. When a challenge is received by tag 22 through receiver 33, processor 31 appends the challenge string to the clear and encrypted IDs, and calculates a hash of the appended string, using techniques known in the art.

d. If the calculated hash is too long to be displayed on changeable string 35, it is truncated by calculating the remainder when divided by a properly-sized number. For example, in the embodiments of FIGS. 2A–4C, the size of the response is four decimal digits, and the remainder will be for division by 10,000, while in the example of FIG. 5 the remainder will be for division by 2.

e. The hash (or the truncated hash) represents the response string, which will be displayed, preferably along with the clear tag ID, on display 34.

f. authentication device 11 then reads and interprets the contents of display 34; separates the tag ID and the received response string; encrypts the tag ID to obtain the tag's secret key; calculates the hash of the clear ID appended to the tag's secret key and the challenge string; truncates the hash to the desired size, if necessary, to obtain the expected response string; and compares the received response string with the expected response to decide authenticity.

A potential weakness of the method described above is in the ability of the user to probe his own tag and read his secret key recorded in ID register 32. This may not be a problem if the only function of the tag is to authenticate the user's identity, but may become a problem if the tag is used to authenticate credentials granted to the user, such as access rights or subway tickets. In such a case, ID register 32 and processor 31 shall preferably be embedded within a tamper-proof chip, such as the one used in smart cards, so that the tag holder will not be able to forge credentials for himself or others.

Where many authentication devices 11 are involved and are liable to loss, theft, or other vulnerabilities, key-management and related security issues may arise, which can be addressed by using secure chips to store keys in these devices, and by employing a suitable public-key infrastructure. Such techniques and capabilities are well-known in the art.

Advantages

Many advantages of the present invention are described herein, and many more may easily be derived with respect to the various preferred embodiments presented above. The following list highlights some of the most important advantages with respect to the prior art:

Mass authentication is supported, with no interference among the individual tags. Thus, for example, in the preferred embodiment of FIGS. 1A–B, a single challenge string broadcast by authentication device 11, can simultaneously trigger different response strings on tags 22, which do not interact or interfere with one another. Thus, individual tags within a group can be authenticated separately regardless of their number or proximity.

Authenticated and unauthenticated objects are visually spotted within a live image, allowing efficient human intervention where needed. Also, such spotting can made in after-the-fact off-line authentication, which will highly facilitate the visual identification of suspects.

The system of the present invention leverages existing security and surveillance infrastructures that already cover the target scene by video cameras.

The present invention lends itself to authentication in a large number of security and commercial applications, such as: tickets for mass transit, sports events or movie theaters; voting by an audience; security passes into restricted areas; convention badges; cars passing a toll road or bridge; a secure license plate for automobiles; checked airborne luggage; SCM (supply chain management) applications; military badges; police badges. In these and other applications, the present invention offers unique advantages in speed, cost, security and practicality.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A visual authentication system, comprising:

a tag attachable to an object, including:

an imprinted image displaying a fixed character string in machine-readable symbols;

a processor for calculating a response string corresponding to the fixed character string and to a challenge string;

a changeable screen controlled by the processor for displaying a changeable image showing the response string in machine-readable symbols; and a disabling means operative to disable said tag upon detecting that said tag is being removed from the object; and an authentication device, including:

a scanner for reading from the tag both the imprinted image and the changeable image;

an image processor for transforming the imprinted image into a first character string and transforming the changeable image into a readout response string; and an authentication processor for calculating an expected response string corresponding to both the first character string and the challenge string, for comparing the readout response string to the expected response string to obtain a comparison result, and for outputting the comparison result.

2. The system of claim 1, wherein said challenge string is generated by said authentication device, said authentication device also including a transmitter to transmit said challenge string, and said tag also including a receiver to receive said challenge string.

3. The system of claim 1, wherein said tag also includes a tag real-time clock, and said challenge string is received by said processor from the tag real-time clock.

4. The system of claim 3, wherein said authentication device also includes a device real-time clock substantially-synchronized with said tag real-time clock, and said expected response string is calculated with respect to a predetermined time interval from the time read from the device real-time clock.

5. The system of claim 4, wherein said comparison result is obtained by checking whether the readout response string matches the expected response string with respect to an instance from said time interval.

6. The system of claim 1, wherein said response string is represented on said changeable screen by a series of snapshots, and said image processor is further operable to compose said readout string from the series of snapshots.

7. The system of claim 1, wherein said authentication processor is further operative to output a positive outcome of said comparison result only upon reaching a predetermined plurality of successful matches between readout response strings and their corresponding expected response strings.

8. The system of claim 1, comprising a plurality of said tag, and said authentication device is operative to acquire a scene image covering the plurality of tags, read the respective imprinted image and changeable image of each tag of the plurality by processing said scene image, and calculate and output said comparison result for each tag of the plurality.

9. The system of claim 8, wherein said authentication device is also operative to output said scene image containing said plurality, and visually spot each individual tag of said plurality according to said comparison result respective to the individual tag.

10. The system of claim 1, wherein said tag also includes an object interface to receive an object message, said changeable screen is operative to show also the object message, and said processor is operative to calculate said response string with respect also to the object message.

11. The system of claim 1, wherein said tag also includes a credentials register, said changeable screen is operative to show also the content of the credentials register, and said processor is operative to calculate said response string with respect also to the content of the credentials register.

12. The system of claim 1, wherein said tag is assigned to a human user, said tag also stores user authentication data of the user, said tag also includes an object interface to receive a user authentication input from the user, and said processor is also operative to enable said tag only when the user authentication input matches the user authentication data.

13. An authentication device cooperative with a plurality of tags included in a scene, each tag including an imprinted image displaying a fixed character string in machine-readable symbols and a respective changeable screen for displaying symbols representing a response string corresponding to the fixed character string and to a challenge string, the authentication device comprising:

a scanner for scanning the scene to produce a scene image;

an image processor for processing said scene image to identify the tags, reading from each tag both the imprinted image and the changeable screen image, and transforming each imprinted image into a respective first character string and transforming each changeable screen image into a respective readout response string; and an authentication processor for calculating, for each tag of the tags, an expected response string corresponding to both the tag's first character string and the tag's challenge string, for comparing the tag's readout response string to the tag's expected response string to obtain a comparison result, and for outputting the comparison result for each tag of the tags.

14. The authentication device of claim 13, further comprising means to generate said challenge string and a transmitter to transmit said challenge string to the plurality of tags.

15. The authentication device of claim 13, further comprising a device real-time clock, and said expected response string is calculated with respect to a predetermined time interval from the time read from the device real-time clock.

16. The authentication device of claim 15, wherein each of said readout response strings is compared to each of said respective expected response string by checking whether the readout response string matches the expected response string with respect to an instance from said time interval.

17. The authentication device of claim 13, wherein each of said response strings is represented on said changeable screen by a series of snapshots, and said image processor is further operable to compose said readout string from the series of snapshots.

18. The authentication device of claim 13, wherein said authentication processor is further operative to output a positive outcome of said comparison result for each tag of said plurality only upon reaching a predetermined plurality of successful matches between readout response strings and their corresponding expected response strings.

19. The authentication device of claim 13, wherein said authentication processor is further operative to output said scene image containing said plurality, and visually spot each individual tag of said plurality according to said comparison result respective to the individual tag.

20. A method for visual authentication of a tag by an authentication device, the tag being attached to an object, the tag having an imprinted image displaying a fixed character string in machine-readable symbols; the method comprising:

disabling the tag upon detecting that the tag is being removed from the object;

calculating by the tag a response string corresponding to both a challenge string and the fixed character string;

displaying by the tag a changeable image showing the response string in machine-readable symbols;

reading by the authentication device from the tag both the imprinted image and the changeable image;

transforming by the authentication device the imprinted image into the fixed character string and the changeable image into a readout response string;

calculating by the authentication device an expected response string corresponding to both the challenge string and the fixed character string;

comparing by the authentication device the readout response string to the expected response string to obtain a comparison result; and outputting by the authentication device the comparison result.

21. The method of claim 20, further comprising generating said challenge string by said authentication device and transmitting it to said tag.

22. The method of claim 21, further comprising receiving said challenge string by said tag from a tag real-time clock included in said tag.

23. The method of claim 22, further comprising calculating said expected response string by said authentication device with respect to a predetermined time interval from the time read from a device real-time clock included in said authentication device.

24. The method of claim 20, further comprising composing said readout string by said authentication device from a series of symbol snapshots read from said tag.

25. The method of claim 20, further comprising deciding by said authentication device to output a positive outcome of said comparison result only upon reaching a predetermined plurality of successful matches between readout response strings and their corresponding expected response strings.

26. The method of claim 20 for authentication a plurality of said tag included in a scene, wherein said reading for all tags of said plurality comprises scanning the scene to produce a scene image and processing said scene image to identify each tag and interpret its symbols to affect said reading.

27. The method of claim 26, further comprising: outputting said scene image by said authentication device, and visually spotting each individual tag of said plurality according to said comparison result respective to the individual tag.

28. The method of claim 20, further comprising receiving a message from an object, calculating said response string with respect also to the message, and displaying also the message in said machine-readable symbols.

29. The method of claim 20, further comprising receiving credentials, calculating said response string with respect also to the credentials, and displaying also the credentials in said machine-readable symbols.

30. The method of claim 20, further comprising identifying an object by said authentication device, checking whether the object bears said tag, and outputting a negative authentication result if the object does not bear said tag.

* * * * *